United States Patent
Kim et al.

(10) Patent No.: US 10,149,184 B2
(45) Date of Patent: Dec. 4, 2018

(54) METHOD AND APPARATUS FOR LOGGING AND REPORTING MBMS-RELATED MEASUREMENT INFORMATION IN WIRELESS COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR); Kyeongin Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 25 days.

(21) Appl. No.: 14/247,861

(22) Filed: Apr. 8, 2014

(65) Prior Publication Data

US 2014/0301210 A1 Oct. 9, 2014

(30) Foreign Application Priority Data

Apr. 8, 2013 (KR) .................. 10-2013-0037974

(51) Int. Cl.
*H04W 24/08* (2009.01)
*H04W 24/10* (2009.01)
*H04L 1/00* (2006.01)

(52) U.S. Cl.
CPC .......... *H04W 24/08* (2013.01); *H04W 24/10* (2013.01)

(58) Field of Classification Search
CPC .............................. H04W 24/08; H04W 24/10
USPC ......................................... 370/241; 861/241
See application file for complete search history.

(56) References Cited

U.S. PATENT DOCUMENTS

| | | | |
|---|---|---|---|
| 8,279,791 B2 | 10/2012 | Ma et al. | |
| 9,629,074 B2 | 4/2017 | Sun et al. | |
| 9,807,636 B2 | 10/2017 | Lee et al. | |
| 2011/0103251 A1 | 5/2011 | Ma et al. | |
| 2011/0194441 A1* | 8/2011 | Jung et al. | .............. 370/252 |
| 2012/0088457 A1 | 4/2012 | Johansson et al. | |
| 2012/0099434 A1 | 4/2012 | Sun et al. | |

(Continued)

FOREIGN PATENT DOCUMENTS

| | | |
|---|---|---|
| CN | 101534474 | 9/2009 |
| CN | 101800935 | 8/2010 |

(Continued)

OTHER PUBLICATIONS

3GPP TS 37.320 V11.3.0 (Mar. 2013); 3rd Generation Partnership Project; Technical Specification Group Radio Access Network; Universal Terrestrial Radio Access (UTRA) and Evolved Universal Terrestrial Radio Access (E-UTRA); Radio measurement collection forMinimization of Drive Tests (MDT); Overall description; Stage 2 (Release 11); Mar. 2013.*

(Continued)

*Primary Examiner* — Faisal Choudhury

(74) *Attorney, Agent, or Firm* — The Farrell Law Firm, P.C.

(57) ABSTRACT

A method and an apparatus for logging and reporting MBMS-related measurement information by a terminal in a wireless communication system is provided. The method includes receiving, from a base station, configuration information for configuring the terminal to receive an MBMS; and logging, if the terminal receives the MBMS, information of the MBMS based on the received configuration information.

12 Claims, 14 Drawing Sheets

(56) References Cited

U.S. PATENT DOCUMENTS

| | | | |
|---|---|---|---|
| 2012/0108199 A1* | 5/2012 | Wang | H04W 76/10 455/405 |
| 2012/0155364 A1* | 6/2012 | Kim et al. | 370/312 |
| 2012/0163273 A1 | 6/2012 | Na et al. | |
| 2013/0010624 A1* | 1/2013 | He | H04L 41/5009 370/252 |
| 2013/0010631 A1* | 1/2013 | Jung | H04W 24/10 370/252 |
| 2013/0039250 A1* | 2/2013 | Hsu | 370/312 |
| 2013/0055318 A1 | 2/2013 | Wang et al. | |
| 2013/0070632 A1 | 3/2013 | Jung et al. | |
| 2013/0107787 A1* | 5/2013 | Wu | 370/312 |
| 2013/0109320 A1 | 5/2013 | Tomala et al. | |
| 2013/0279489 A1* | 10/2013 | Calcev | H04W 76/10 370/338 |
| 2014/0056168 A1* | 2/2014 | Jung | H04W 24/08 370/252 |
| 2014/0128057 A1* | 5/2014 | Siomina | H04J 3/0685 455/423 |
| 2015/0031366 A1* | 1/2015 | Lee | H04W 24/10 455/436 |
| 2015/0044973 A1* | 2/2015 | Siomina | H04W 24/10 455/67.11 |
| 2015/0055448 A1* | 2/2015 | Lee | H04B 7/26 370/216 |
| 2015/0103770 A1* | 4/2015 | Chang | H04W 76/027 370/329 |
| 2015/0201344 A1* | 7/2015 | Wu | |
| 2015/0373506 A1* | 12/2015 | Jung | H04L 12/189 370/312 |

FOREIGN PATENT DOCUMENTS

| | | |
|---|---|---|
| CN | 101931981 | 12/2010 |
| CN | 102215455 | 10/2011 |
| CN | 102754470 | 10/2012 |
| EP | 2 528 270 | 11/2012 |
| WO | WO 2011/157292 | 12/2011 |
| WO | WO 2012/047070 | 4/2012 |
| WO | WO 2012/148203 | 11/2012 |

OTHER PUBLICATIONS

CATT, "Scope of MDT on Coverage Optimization", R2-100073, 3GPP TSG RAN WG2 Meeting #68 bis, Jan. 18-22, 2010, 2 pages.

European Search Report dated Jan. 25, 2016 issued in counterpart application No. 14782481.7-1854, 12 pages.

European Search Report dated Nov. 6, 2017 issued in counterpart application No. 201480004018.7, 9 pages.

European Search Report dated Jul. 25, 2018 issued in counterpart application No. 18168828.4-1214, 11 pages.

* cited by examiner

METHOD AND APPARATUS FOR LOGGING AND REPORTING MBMS-RELATED MEASUREMENT INFORMATION IN WIRELESS COMMUNICATION SYSTEM

PRIORITY

This application claims priority under 35 U.S.C. § 119(a) to Korean Patent Application No. 10-2013-0037974, filed on Apr. 8, 2013, the entire disclosure of which is hereby incorporated by reference.

BACKGROUND OF THE INVENTION

1. Field of the Invention

The present invention relates generally to methods and apparatuses for logging and reporting MBMS-related measurement information in a wireless communication system, and more particularly, to methods and apparatuses for measuring and reporting the performance of services related to MBMS by user terminals in a wireless communication system.

2. Description of the Prior Art

In recent years, a standardizing operation for Long Term Evolution (LTE) has been used in the $3^{rd}$ generation partnership project (3GPP). LTE is a technology achieves high-speed packet based communication having a maximum speed of about 100 Mbps more than a normal data transmission rate. To accommodate the high speed transmission rate, the structure of a network can be simplified by reducing the number of nodes located in the communication path, or a wireless protocol can be provided proximate to a wireless channel.

Resources to be allotted may be determined depending on the amount of data to be transmitted and a circumstance of a channel in data services different from voice services. Accordingly, schedulers manage to allot transmission resources by considering the amount of resources to be transmitted, a circumstance of a channel, and the amount of data in a wireless communication system such as a mobile communication system.

An advanced LTE system includes an improvement of a Multimedia Broadcast Multicast Service (MBMS). The MBMS is a broadcasting service provided through an LTE system. Providers should optimize service areas for the MBMS service as well as unicast communication, and to this end, typical drive test should be taken. Accordingly, methods of taking a drive test for this MBMS service are required.

SUMMARY OF THE INVENTION

In order to address the above-described problems and/or disadvantages described above and to provide at least the advantages described below, aspects of the present invention provide a method and an apparatus for performing a drive test to provide stable MBMS services.

In accordance with an aspect of the present invention, a method for logging Multimedia Broadcast Multicast Service (MBMS)-related information in a terminal of a mobile communication system is provided. The method includes receiving, from a base station, configuration information for configuring the terminal to receive an MBMS; and logging, if the terminal receives the MBMS, information of the MBMS based on the received configuration information.

In accordance with another aspect of the present invention, a method for logging Multimedia Broadcast Multicast Service (MBMS)-related information in a base station of a mobile communication system is provided. The method includes transmitting, to a terminal, configuration information related to the terminal for configuring the terminal to receive an MBMS and log information relating to the MBMS, wherein the terminal logs information of the MBMS based on the configuration if the terminal receives the MBMS.

In accordance with another aspect of the present invention, a terminal for logging Multimedia Broadcast Multicast Service (MBMS)-related information in a mobile communication system is provided. The terminal includes a transmitting/receiving unit that transmits and receives signals to and from a base station; and a control unit that controls the transmitting/receiving unit, receives configuration information related to the terminal from the base station, logs, if the terminal receives an MBMS, information of the MBMS based on the received configuration information, and transmits the logged MBMS information to the base station.

In accordance with another aspect of the present invention, a base station for logging Multimedia Broadcast Multicast Service (MBMS)-related information in a mobile communication system. The base station includes a transmitting/receiving unit that transmits and receives signals; and a control unit that controls the transmitting/receiving unit for transmitting to a terminal configuration information related to the terminal for configuring the terminal to receive an MBMS and log information relating to the MBMS, wherein, after the terminal receives the MBMS, logged information of the MBMS based on the received configuration information is transmitted to the base station.

According to an embodiment of the present invention, a drive test for providing an MBMS service can be minimized. A user's availability can be enhanced by minimizing the drive test as above.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE INVENTION

Figure 1:
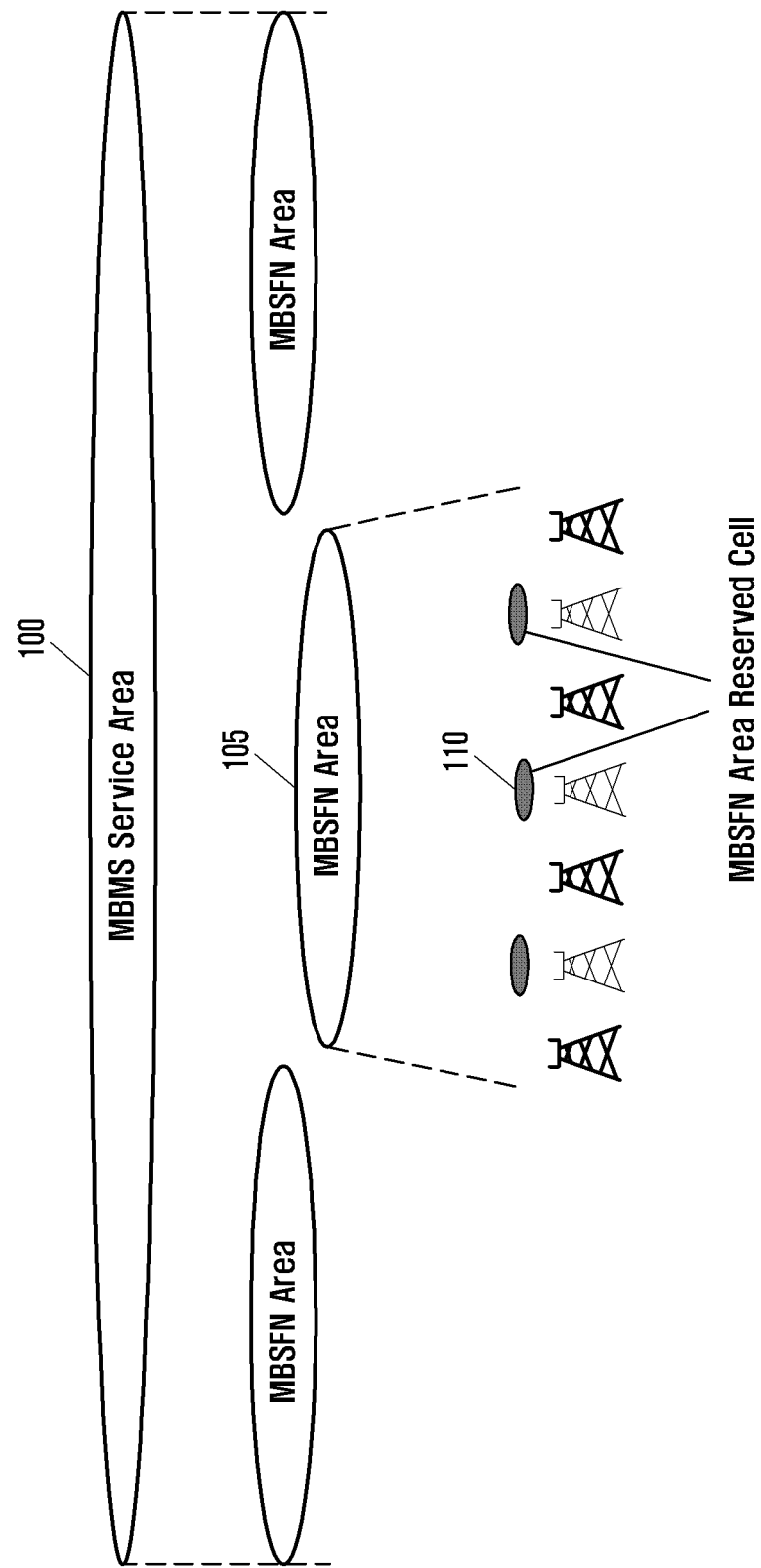
FIG. 1 is a conceptual diagram of an MBMS, according to an embodiment of the present invention.

Hereinafter, various embodiments of the present invention will be described in detail with reference to the accompanying drawings.

In describing the embodiments of the present invention, descriptions related to technical contents which are well-known in the art to which the present invention pertains, and are not directly associated with the present invention, will be omitted. Such an omission of unnecessary descriptions is intended to prevent obscuring of the main idea of the present invention and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

In accordance with an embodiment of the present invention, a method and an apparatus are provided for logging and reporting measurement information related to a Multimedia Broadcast Multicast Service (MBMS) by terminals in wireless communication systems. To this end, a method for defining and logging information that is useful to optimize MBMS service areas is herein described. In addition, a method is provided for reporting the logged information to base stations.

FIG. 1 is a conceptual diagram of an MBMS, according to an embodiment of the present invention.

Referring to FIG. 1, an MBMS service area 100 is a network area that includes a multitude of base stations which can perform Multimedia Broadcast multicast service Single Frequency Network (MBSFN) transmission.

An MBSFN area 105 is a network area which includes several combined cells for MBSFN transmission, and cells in the MBSFN areas may be synchronized with MBSFN transmission.

All the cells except for MBSFN area reserved cells 110 are used for MBSFN transmission. The MBSFN area reserved cells 110 are not used for MBSFN transmission and may be used for transmission for other purposes, but a limited transmitting power may be allowed with respect to wireless resources which are allotted for MBSFN transmission.

Figure 2:
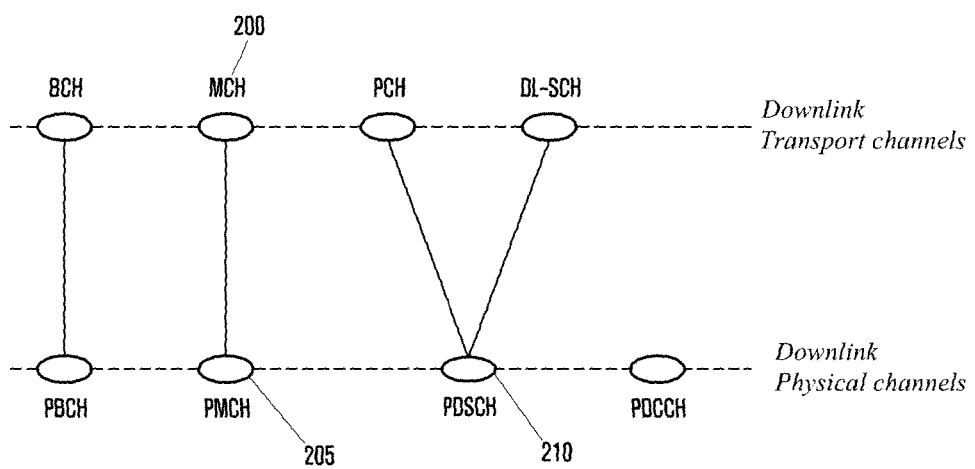
FIG. 2 is a mapping diagram of a downlink channel which is used for transmitting an MBSFN, according to an embodiment of the present invention.

FIG. 2 illustrates a mapping relation of a downlink channel used for MBSFN transmission, according to an embodiment of the present invention.

As shown in FIG. 2, a Multicast Channel (MCH) 200 is used between a MAC layer and a physical layer, and the MCH 200 is mapped with a Physical Multicast Channel (PMCH) 205 of the physical layer. In the embodiment, a terminal (not shown) may measure signals transmitted from the MCH.

A unicast method that transmits data to specific terminals may generally use a Physical Downlink Shared Channel (PDSCH) 210.

Figure 3:
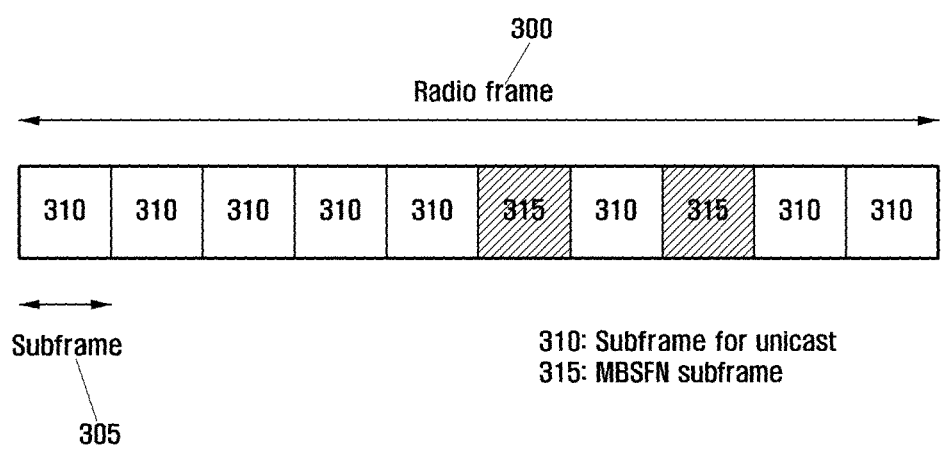
FIG. 3 illustrates a downlink frame structure which is used in an LTE system, according to an embodiment of the present invention.

FIG. 3 illustrates a downlink frame structure that is used in an LTE system, according to an embodiment of the present invention.

As shown in FIG. 3, a radio frame 300 includes ten sub-frames 305. Here, the sub-frames may be divided into "normal sub-frames" 310, which are used for general transmission and reception of data, and a Multimedia Broadcast multicast service Single Frequency Network (hereinafter referred to as an MBSFN) sub-frames 315, which are used for broadcasts.

The normal sub-frames 310 and the MBSFN sub-frames 315 are different from each other in at least one of structure, number, such as the number of Orthogonal Frequency Division Multiplexing (hereinafter referred to as OFDM) symbols, a length of cyclic prefix, cell-specific reference signals (CRSs), or the like.

The MBSFN sub-frames may be used for transmitting broadcast data or multicast data in Rel-8 and Rel-9 systems. However, as systems advance, the MBSFN sub-frames can also be used for a unicast, as well as, a broadcast and a multicast from LTE Rel-10.

In order to effectively use a Physical Downlink Shared Channel (hereinafter referred to as a PDSCH) in the LTE, each terminal may be divided into a multi-antenna technology and a transmission mode (TM) related to reference signals (RSs).

Currently, TM1 to TM9 exist in the LTE Rel-10. Each terminal has one TM for transmitting a PDSCH and TM8 and TM9 defined in Rel-9 and Rel-10, respectively.

The TM9 supports a single user-multi-input multi-output (SU-MIMO) that has a maximum of 8 ranks. The TM9 supports transmission of multilayers and enables transmission of a maximum 8 layers using Rel-10 Demodulation Reference Signal (hereinafter referred to as a DMRS) during de-modulation. In addition, the Rel-10 DMRS is transmitted as a pre-coded DMRS, but it is not necessary to inform a receiving end of the corresponding pre-coder index when the DMRS is being transmitted. Also, in order to support the TM9, Downlink Control Information (hereinafter referred to as DCI) format 2C may be defined in the Rel-10. Particularly, terminals prior to the Rel-10 are not configured to decode in the MBSFN sub-frames. Accordingly, to configure the terminals prior to the REL-10 for decoding a in the MBSFN sub-frames may lead to a demand for upgrading previously released terminals.

In accordance with an embodiment of the present invention, instead of making all the terminals receive unicast data in the MBSFN sub-frames, terminals are provided with high-speed data communication capabilities.

Specially, the TM9, among the above-described TMs, is a transmission mode that maximizes an efficiency of transmission using a multi-antenna configuration. Base stations in accordance with an embodiment of the present invention configure terminals that need to increase data throughput with TM9 by receiving unicast data in the MBSFN sub-frames and allow only terminals configured with TM9 to receive unicast data in the MBSFN sub-frames.

In order to transmit and receive unicast data, a PDCCH informs of the location of transmission and reception of data and a PDSCH transmits data in the LTE system. In accordance with an embodiment of the present invention, a terminal is provided and determines whether resource allotment information that is allotted to the terminal by the PDCCH exists before actual data is received.

The MBSFN obtains resource allotment information through one or more processes. In embodiments, for example, a base station may be configured to inform the terminal of a transmission location of a Multicast Control Channel (MCCH) for each MBSFN area which is provided by a cell through a System Information Block (SIB) 13 that is broadcast information. The MCCH may include resource allotment information for the MBSFN, and the terminal decodes the MCCH to thereby recognize a transmission location of a MBSFN sub-frame.

The MBMS provides resource allotment information in a manner that is different from the typical unicast. In particular, the MBMS is provided to a terminal that is in an idle mode. Accordingly, a transmission location of the MCCH that is a control channel is informed by the SIB13 of broadcast information. The overall process of receiving an MBMS service will be described with reference to FIG. 4.

Figure 4:
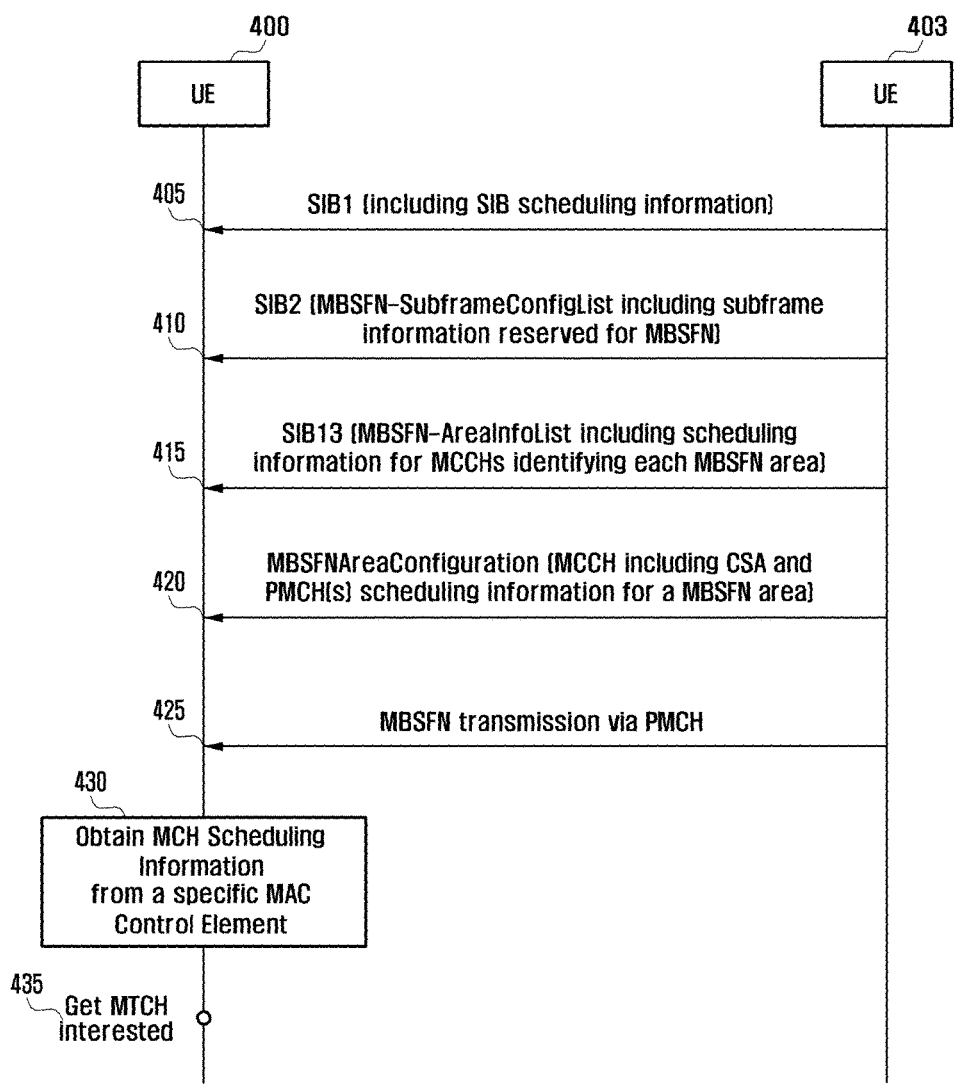
FIG. 4 is a signaling diagram illustrating a process of receiving an MBSFN in a terminal, according to an embodiment of the present invention.

FIG. 4 is a flowchart illustrating a process of receiving an MBMS in a terminal, according to an embodiment of the present invention.

Referring to FIG. 4, at step 405, a terminal 400 receives an SIB1 from a base station 403. This SIB1 may include scheduling information of other SIBs as well as the SIB1. Accordingly, the terminal 400 receives SIB1 in advance in order to receive other SIBs.

At step 410, the terminal 400 receives an SIB2 from the base station 403. An "MBSFN-SubframeConfigList IE" of the SIB2 may indicate sub-frames which can be used for the purpose of MBSFN transmission. The "MBSFN-SubframeConfigList IE" may include, for example, "MBSFN-SubframeConfig IE" and may indicate sub-frames of radio frames which can be MBSFN sub-frames. Table 1 shows a configuration of the "MBSFN-SubframeConfig IE".

TABLE 1

MBSFN-SubframeConfig information element

| | |
|---|---|
| -- ASN1START | |
| MBSFN-SubframeConfig ::= | SEQUENCE { |
| radioframeAllocationPeriod | ENUMERATED (n1, n2, n4, n8, n16, n32), |
| radioframeAllocationOffset | INTEGER (0..7), |
| subframeAllocation | CHOICE { |
| oneFrame | BIT STRING (SIZE (6)), |
| fourFrames | BIT STRING (SIZE (24)), |

TABLE 1-continued

MBSFN-SubframeConfig information element

}
}
-- ASN1STOP

Here, "radioFrameAllocationPeriod" and "radioFrameAllocationOffset" are used to indicate radio frames having MBSFN sub-frames, and radio frames that satisfy a formula SFN mod "radioFrameAllocationPeriod=radioFrameAllocationOffset" have MBSFN sub-frames.

The SFN denotes a System Frame Number, and it indicates a radio frame number that is repeated in the range of 0 to 1023. The "subframeAllocation" shows which sub-frame is a MBSFN sub-frame in a radio frame indicated by the formula. Every single radio frame or every four radio frames may be indicated. In a case of using every single radio frame, it is indicated in the "oneFrame IE". MBSFN sub-frames may exist among the first, the second, the third, the sixth, the seventh, and the eighth sub-frames among ten sub-frames in a total in one radio frame. Accordingly, the "oneFrame IE" indicates an MBSFN sub-frame among the above-mentioned sub-frames using 6 bits. In a case of using every four radio frames, it is indicated in the "fourFrames IE". An MBSFN sub-frame is indicated among the above-mentioned sub-frames on each radio frame using 24 bits in total in order to cover four radio frames. Accordingly, a terminal may recognize a sub-frame that can be a MBSFN sub-frame using the "MBSFN-SubframeConfigList IE".

If the terminal 400 wants to receive the MBSFN, the terminal 400 receives a SIB13 from the base station at step 415. The "MBSFN-AreaInfoList IE" of the SIB13 may include information on the location to which an MCCH of each MBSFN area that is provided by the cell is transmitted.

At step 420, the terminal 400 may receive an MCCH using the information received at step 415. Table 2 shows "MBSFN-AreaInfoList IE". The MCCH corresponding to each MBSFN area exists in each MBSFN area, and "MBDFN-AreaInfoList IE" includes MCCH scheduling information of all MBSFN areas. "MBSFN-AreaInfo IE" includes MCCH scheduling and other information. "Mbsfn-AreaId" is an MBSFN area ID. "Non-MBSFNregionLength" denotes the number of symbols corresponding to non-MBSFN areas among symbols in the MBSFN sub-frame. The symbol is located in front of the sub-frame. "NotificationIndicator" is used to indicate a PDCCH bit that informs the terminal about a change of MCCH information. "Mcch-Config IE" contains MCCH scheduling information. "Mcch-RepetitionPeriod" and "mcch-Offset" are used to indicate a location of a frame that includes an MCCH. "Mcch-ModificationPeriod" is a transmission period of an MCCH, and "sf-AllocInfo" indicates a location of a sub-frame including an MCCH in the frame including an MCCH. "SignallingMCS" denotes a sub-frame that is indicated by "sf-AllocInfo" and a Modulation and Coding Scheme (MCS) that is applied to (P)MCH.

| MBSFN-AreaInfoList information element | |
|---|---|
| -- ASN1START | |
| MBSFN-AreaInfolist-r9 ::= | SEQUENCE (SIZE(1..maxMBSFN-Area)) OF MBSFN-AreaInfo-r9 |
| MBSFN-AreaInfo-r9 ::= | SEQUENCE { |
| mbsfn-AreaId-r9 | INTEGER (0..255), |
| non-MBSFNregionLength | ENUMERATED (s1, s2), |
| notificationIndication-r9 | INTEGER (0..7), |
| mcch-Config-r9 | SEQUENCE { |

-continued

| MBSFN-AreaInfoList information element | |
|---|---|
| mcch-RepetitionPeriod-r9 | ENUMERATED (rf32, rf64, rf128, rf256), |
| mcch-Offset-r9 | INTEGER (0..10), |
| mcch-ModificationPeriod-r9 | ENUMERATED (rf512, rf1024), |
| sf-AllocInfo-9 | BIT STRING (SIZE 6)), |
| signallingMCS-r9 | ENUMERATED (n2, n7, n13, n19) |
| }, | |
| ... | |
| }, | |

"MBSFNAreaConfiguration IE" of an MCCH indicates locations of resources used for MBSFN transmission.

At step 425, the terminal 400 receives an MBSFN sub-frame using information received at step 415. "CommonSF-Alloc" shows a sub-frame that is allotted in an MBSFN area. "CommonSF-AllocPeriod" is a repetition period of sub-frames indicated by the "commonSF-Alloc." "Pmch-Info-List IE" may include all PMCH configuration information in one MBSFN area.

```
MBSFNAreaConfiguration message

-- ASN1START
MBSFNAreaConfiguration-r9 ::=        SEQUENCE {
    commonSF-Alloc-r9                    CommonSF-AllocPatternList-r9,
    commonSF-AllocPeriod-r9              ENUMERATED {
                                            rf4, rf8, rf16, rf32, rf64, rf128, rf256),
    pmch-InfoList-r9                     PMCH-InfroList-r9,
    nonCriticalExtension                 MBSFNAreaConfiguration-v930-IEs   OPTIONAL
}
MBSFNAreaConfiguration-v930-IEs ::=  SEQUENCE {
    lateNonCriticalExtension             OCTET STRING                       OPTIONAL,  --
Need OP
    nonCriticalExtension                 SEQUENCE { }                       OPTIONAL   --
Need OP
}
CommonSF-AllocationPatternList-r9 ::= SEQUENCE (SIZE (1..maxMBSFN-Allocations)) OF MBSFN-
SubframeConfig
-- ASN1STOP
```

At step 430, the terminal 400 may obtain the location of a MBSFN sub-frame where a desired MTCH is transmitted from MCH scheduling information MAC Control Element (CE) that is one of MAC CE of received MAC PDU.

At step 435, the terminal 400 may decode a desired MTCH by using MCH scheduling information.

Similar to a unicast service, service areas of an MBMS service may be designed not to have shadow areas or weak-signal areas. To this end, cells and system configurations may be optimized on the basis of measurement information that is collected by taking a typical drive test. However, such configurations may cause an increase in the wireless optimization cost and management cost and may take a long time. Minimization of Drive Test (MDT) may be utilized for minimizing a drive test and improving the processing of analysis and manual configuration with respect to a wireless environment. This technology may be utilized to optimize service areas of the MBMS service.

Figure 5:
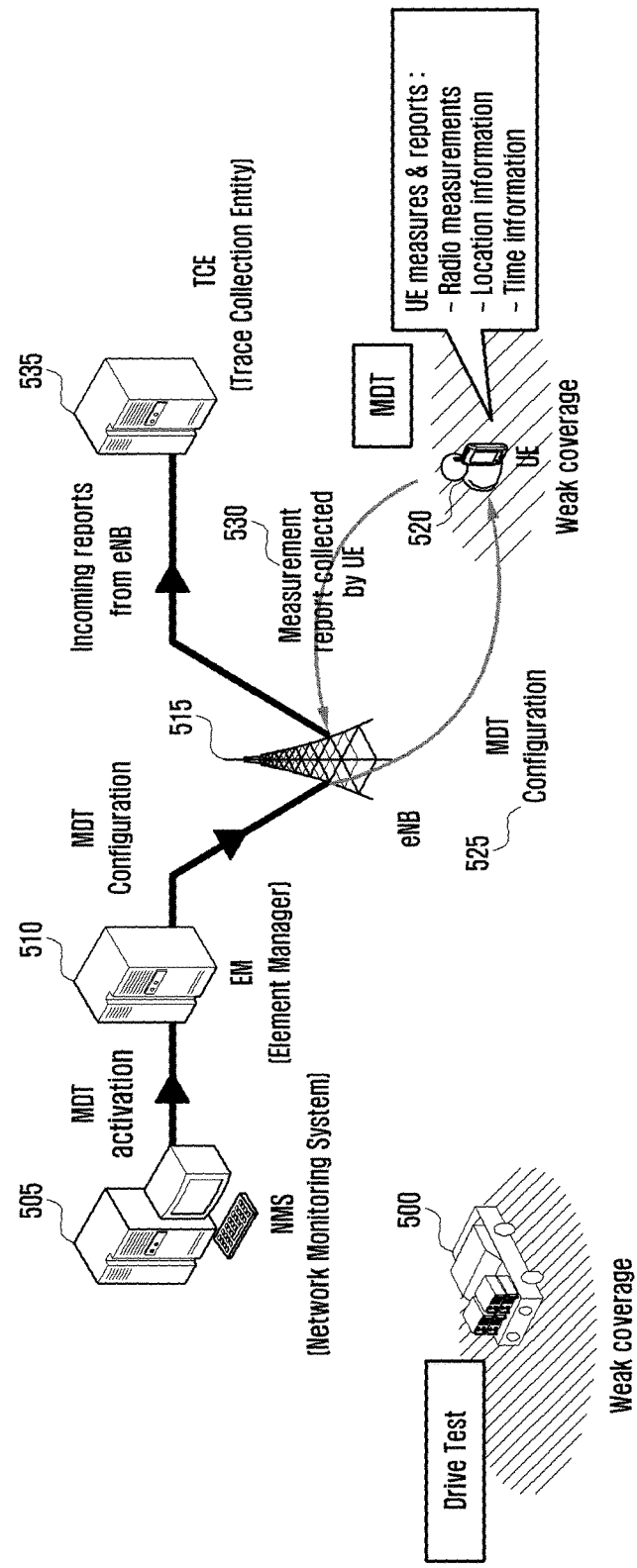
FIG. 5 is a conceptual diagram illustrating a performance of an MDT, according to an embodiment of the present invention.

FIG. 5 is a conceptual diagram illustrating a performance of MDT, according to an embodiment of the present invention.

Referring to FIG. 5, a drive test 500 is performed by loading measuring equipment on vehicles, going around service areas to find shadow areas, and measuring a signal state. Terminals 520 perform the above operation in MDT. An NMS 505 may be configured to instruct a performance of MDT. At this time, necessary configuration information is provided to an EM 510. The EM 510 makes an MDT configuration and transfers the same to an eNB 515. The eNB 515 transfers the MDT configuration to a UE 520 to instruct MDT in step 525.

The UE 520 collects the MDT measurement information, which may include location and time information as well as signal measurement information. The collected information is reported to eNB 515 at step 530. The eNB 515 transfers the collected information to the TCE 535. The TCE 535 may be a server that collects MDT measurement information in the embodiment.

Conventional MDT technology focuses on collection of measurement information that is not necessarily related to MBMS. Therefore, an embodiment of the present invention relates to a method for defining useful information for optimizing MBMS service areas and logging the information. In addition, a method for reporting the logged information to base stations is also described.

In accordance with an embodiment of the present invention, information is defined to detect problems in MBMS service areas. A terminal collects at least one piece of MBMS information among the information, defined in detail below, and reports the same to a base station. The processes of logging and reporting the information will be described in detail below.

MBMS configuration denotes MBMS configuration information that is applied when trying to receive an MBMS service. In the MBMS configuration information, a serving cell ID (ECGI or PCI), an MBSFN area ID, and session time are provided, and at least one of them is included in MBMS configuration information to be logged and reported.

Failure cause value refers to a reason why an MBMS service is not received successfully. As described above, one or more processes are performed in order to successfully receive an MBMS service. Accordingly, information on which step has a problem may be important to optimize the MBMS service areas.

A set of failure causes may include {SIB1 failure, SIB2 failure, SIB13 failure, MCCH reception failure, PMCH reception failure}.

Other causes may include a block error rate (BLER) of a receiving MBMS service, which is important information to show a broadcasting quality. The information may be collected from each value that is mapped with a serving cell ID, an MBSFN area, or a session.

MBSFN RS-based CSI, i.e. CQI, RI, PMI is a separate reference signal (MBSFN RS) that is transmitted for an MBMS service. A terminal performs a channel adaptation on the basis of the signal. Accordingly, it may be useful for an MBMS optimization to measure the signal and report the resultant Channel Status Information (CSI) to a base station. Specific information of CSI may be CQI, RI, and PMI, and particularly, CQI is most useful. The information may be collected from each value that is mapped with a serving cell ID, an MBSFN area, or a session.

MBSFN RS-based RSRP/RSRQ is a Reference Signal Received Power (RSRP) and a Reference Signal Received Quality (RSRQ) of an MBSFN RS, which are useful in recognizing the state of an MBMS channel. The information may be collected from each value that is mapped with a serving cell ID, an MBSFN area, or a session.

CRS-based RSRP/RSRQ (CGI information included), although an MBSFN RS for the purpose of an MBMS exists, is a Common Reference Signal (CRS) and is useful in recognizing cell service areas as well as an MBMS and comparing and analyzing an MBMS with other channels. Accordingly, RSRP and RSRQ of a CRS are valuable information and may be collected from each value that is mapped with a serving cell ID, an MBSFN area, or a session.

Timestamp shows time information when the above information is logged.

UE location (e.g. GNSS location, RF fingerprint) denotes information on the terminal location when the above information is logged.

Optionally, timestamp, which can be used to obtain GNSS location info, e.g., information on the time when the logged terminal location information, may be included.

A terminal may receive an MBMS service in an idle mode or connection mode. Accordingly, a process in which a terminal collects the above-described MBMS information in each mode and reports the same to a base station is provided. In Example 1, a method for collecting and logging MBMS information in an idle mode, and reporting the same to a base station after converting to a connection mode is described. In Example 2, a method for collecting MBMS information in a connection mode, and reporting the same to a base station is described. In Example 3, a method for collecting and reporting MBMS information until specific time or specific conditions are satisfied is described The method described in example 3 can be implemented in an idle or a connection mode, and this method is particularly useful if the terminal is configured to report MBMS information in a connection mode; this is different from the conventional methods that typically use MDT technology.

Example 1

In Example 1, a method for collecting and logging MBMS information in an idle mode, and reporting the same to a base station after converting to a connection mode is described. In order to optimize an MBMS service area, if a base station wants to receive a report of the above-described MBMS information from a certain terminal, the base station configures the operation using a specific Radio Resource Control (RRC) message when the terminal is in a connection mode. In accordance with an embodiment of the present invention, after the terminal is converted to an idle mode, when the reception of an MBMS service is triggered, the terminal begins to perform the configured operation. If the terminal has been receiving an MBMS service since the connection mode, the terminal performs the configured operation immediately after being converted to an idle mode. If the terminal is converted from an idle mode to a connection mode, the terminal transmits an indicator informing that MBMS information is collected and logged in an idle mode to a base station. The terminal transmits the logged information to the base station through a predetermined procedure. The detailed description will be described with reference to FIG. 6.

Figure 6:
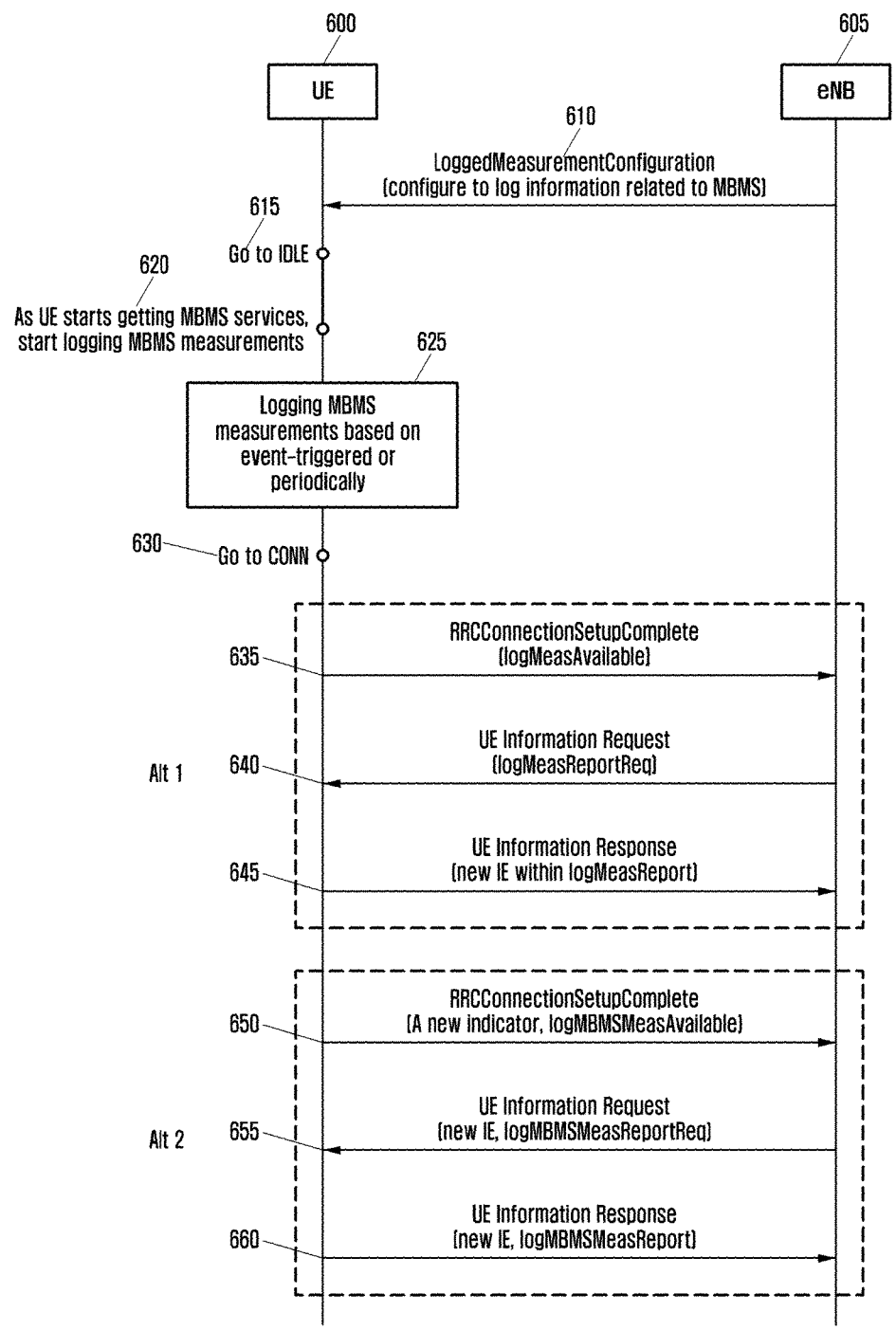
FIG. 6 illustrates a method for collecting and logging MBMS information in an idle mode to thereby report the same to a base station after conversion to a connection mode, according to an embodiment of the present invention.

FIG. 6 illustrates a method for collecting and logging MBMS information in an idle mode and reporting the same after converting to a connection mode, according to an embodiment of the present invention.

Referring to FIG. 6, a base station 605 configures a terminal 600 to log and report MBMS information in a terminal idle mode through a specific RRC message at step 610. In this embodiment, the specific RRC message may be "LoggedMeasurementConfiguration" or "RRCConnectionReconfiguration."

Configuration information included in the RRC message may include at least one of the following.

MBMS information logging time which is information relating to when a terminal in an idle mode performs the logging of MBMS information for the corresponding time. After the terminal is converted to an idle mode, when the reception of an MBMS service is triggered, a timer starts. Alternatively, if the terminal has been receiving an MBMS service since a connection mode, the timer starts immediately after the terminal is converted to an idle mode. The timer continues to operate even when the terminal is converted to a connection mode or a state of out-of coverage, or the MBMS service is stopped. When the timer expires, the terminal stops logging.

The MSMN information can serve as an alternative to stopping the operation of logging MBMS information. In this embodiment a base station may stop the operation of logging MBMS information by the number of times of logging or when specific conditions are satisfied, as well as setting the MBMS logging time. For an example of the specific conditions, a terminal may stop a MBMS service that is being received.

The MBMS information may also include logging methods, e.g., periodically or in a manner of event-trigger, that determine how the MBMS information is logged. A base station provides the information relating to the particular logging method.

In the present invention, at least one of the two methods is configured.

In a periodic configuration method, the MBMS information is logged periodically. The period of logging is provided from a base station.

In an event-triggered configuration method, the MBMS information is logged only when specific conditions are satisfied. Configuration information related to the conditions is provided from a base station.

Examples of the conditions are as follows:

Condition 1: BLER becomes worse than a threshold during the pre-defined time period;

Condition 2: UE does not successfully receive an MBMS service during the pre-defined time period; and Condition 3: eMBMS radio measurements (e.g. MBMS RSRP, MBMS RSRQ) become worse than a threshold during the pre-defined time period.

Determination of which one of the above conditions is applied and determination of configuration information, such as a threshold to be applied to the above conditions and a pre-defined time period, are provided from a base station.

In MBMS information collecting areas, a terminal performs the operation of logging MBMS information in specific areas. A base station indicates the areas of several bases and informs a terminal.

MBSFN area-based requiring MBMS information are indicated by an MBMS area base. A terminal may recognize an MBMS area where the serving cell is included through SIB13 information that is broadcasted. If a current serving cell is not provided in an MBSFN area that is configured by a base station, the operation of logging MBMS information is stopped.

Cell area-based areas requiring MBMS information are indicated by a cell area base.

TA-based areas requiring MBMS information are indicated by a tracking area (TA) base.

Other determination configuration information included in the RRC message may include, but is not limited to, trace-related information (traceReference, traceRecordingSessionRef, tce-Id, and the like), and absolute time information.

In accordance with an embodiment of the present invention, at least one piece of information among the above-identified information is included in the RRC message.

At step 615, the terminal 600 may be converted to an idle mode. The conversion of the terminal 600 may be conducted according to pre-defined conditions.

At step 620, the terminal 600 triggers reception of an MBMS service, and at this time, the terminal 600 starts a timer that shows a time for which the operation of logging MBMS information is performed. According to an embodiment, the terminal 600 may start to log MBMS information only when the MBMS service is started.

At step 625, if the timer is in operation and the terminal 600 is receiving an MBMS service, the terminal 600 may log MBMS information periodically or in an event-triggered manner on the basis of configuration information.

At step 630, the terminal 600 is converted to a connection mode. The conversion of the terminal 600 to a connection mode may be required for the situation in which the base station 605 needs to transmit data or the terminal 600 is to connect with the base station 605. In this embodiment, a next operation is not limited by the condition in which the terminal 600 is connected with the base station 605 according to step 630.

At this time, the terminal 600 may stop the operation of logging MBMS information. The terminal staying in a connection mode transmits an indicator which indicates that MBMS information has been collected and logged in an idle mode to the base station through a specific RRC message. The specific RRC message may include "RRCConnectionSetupComplete," RRCConnectionReconfigurationComplete," and "RRCConnectionReestablishmentComplete." If there is MBMS information that has not been reported after a hand-over and a connection reestablishment as well as a connection establishment, the terminal 600 may transmit the indicator to the base station 605. The terminal 600 transmits the logged MBMS information to the base station 605 through a specific procedure.

The specific procedure may have two options.

The first option re-uses the conventional MDT IEs. In this option, the logged MBMS information may be regarded as a conventional MDT measurement information. Accordingly, "logMeasAvailable IE" 635, which is an indicator used to inform the base station 605 that the terminal 600 has MDT measurement information that has not been reported yet, is still transmitted to the base station 605 when the terminal 600 has MBMS information. Also, the reporting procedure may use IEs defined for the purpose of an MDT retrieval in a UE information request 640 and a UE information response 645.

The second option includes defining separate IEs for reporting MBMS information. New IEs are added into RRC messages identical to the case of MDT. That is, a new indicator 650, which informs that the terminal 600 is logging MBMS information, may be defined in at least one of messages such as "RCConnectionSetupComplete," "RRCConnectionReconfigurationComplete," and "RRCConnectionReestablishmentComplete."

In addition, for an MBMS information retrieval, new IEs may be defined in a UE information request 655 and a UE information response 660. That is, in order to receive a report of MBMS information from the terminal, the base station 605 allows "logMBMSMeasReportReq IE" 655 to be included in the UE information request and then transmits the same to the terminal 600. In response thereto, the terminal 600 allows the logged MBMS information to be included in "logMBMSMeasReport IE" 660 of the UE information response and transmits the same to the base station 605.

The above-described operation of the terminal 600 is limited to terminals 600 which have an ability of receiving an MBMS and which are to receive an MBMS service.

Figure 7:
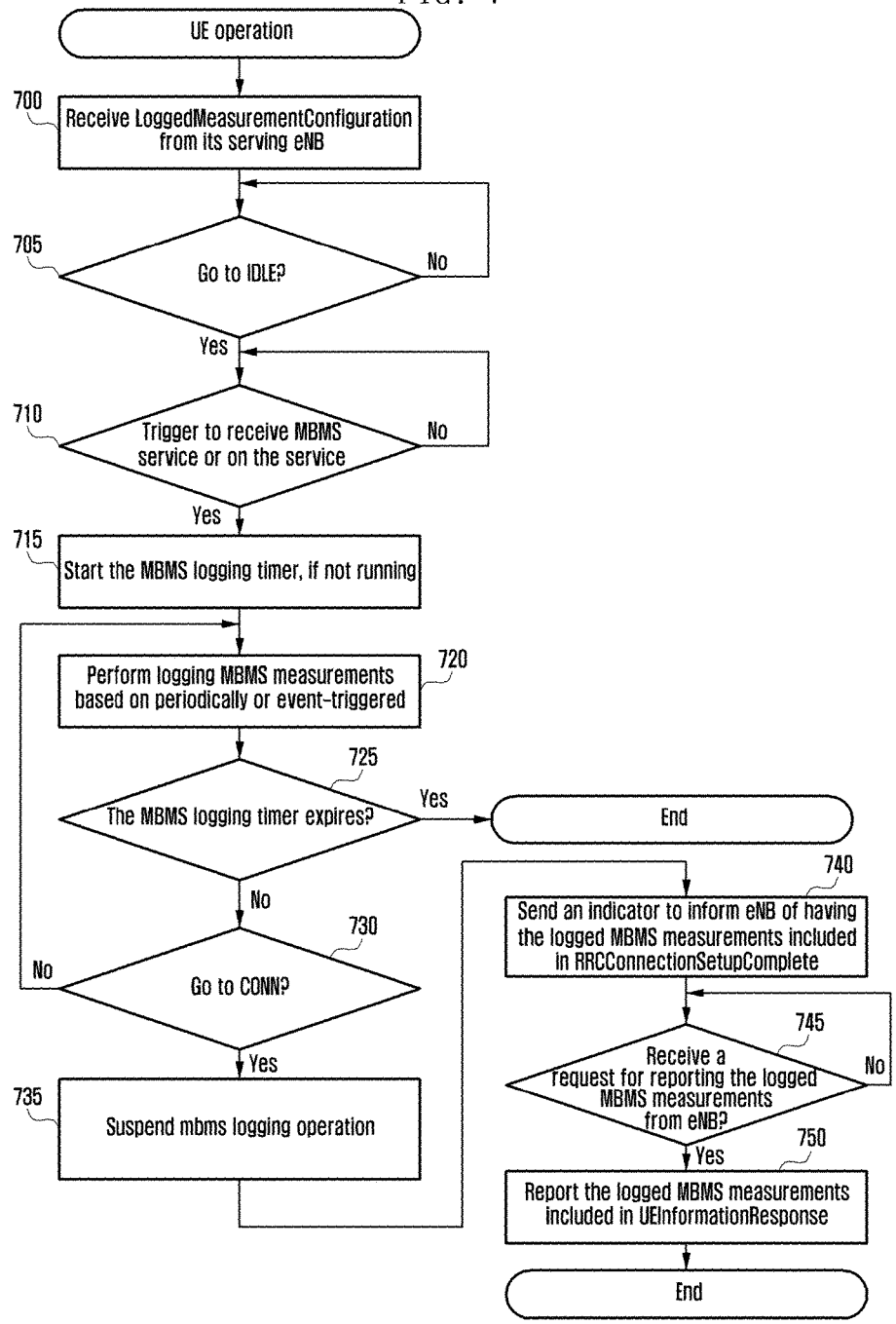
FIG. 7 is a flow chart that illustrates an operation of a terminal, according to an embodiment of the present invention.

FIG. 7 illustrates an operation of a terminal, according to an embodiment of the present invention.

Referring to FIG. 7, at step 700, a terminal may receive a message of "LoggedMeasurementConfiguration" from a base station. The above RRC message allows the terminal to configure an MBMS information logging operation in an idle mode.

At step 705, the terminal determines whether it is converted to an idle mode.

If the terminal has been converted to an idle mode in step 705, the terminal determines whether reception of an MBMS service is triggered or the terminal has been receiving an MBMS service at step 710.

If the terminal receives an MBMS service at step 710, the terminal allows an MBMS logging timer to operate at step 715. In this embodiment, the timer may have operated already according to the reception of an MBMS service. As set for above, the triggered timer continues to operate even when the terminal is converted to a connection mode to thereby suspend the MBMS logging operation. Further, if the terminal is converted to an idle mode again and is receiving an MBMS service, the terminal may resume the MBMS information logging operation as long as the timer does not expire. When the timer expires, the MBMS logging operation terminates.

At step 720, the terminal logs MBMS information periodically or in an event-triggered manner.

At step 725, the terminal determines whether the timer has expired. If the timer has expired, the terminal may stop the MBMS logging operation.

At step 730, the terminal determines whether it is converted to a connection mode.

If the terminal is converted to a connection mode, the terminal suspends the ongoing MBMS logging operation at step 735.

At step 740, the terminal may transmit an indicator that indicates the terminal has logged MBMS information ready for reporting to the base station by using a specific RRC message.

At step 745, the terminal may determine whether the base station requests a report on the information. If the request for a report on the information is received at step 745, the terminal allows the information to be included in a "UEInformationResponse" message and report the same to the base station according to the request of the base station at step 750.

Figure 8:
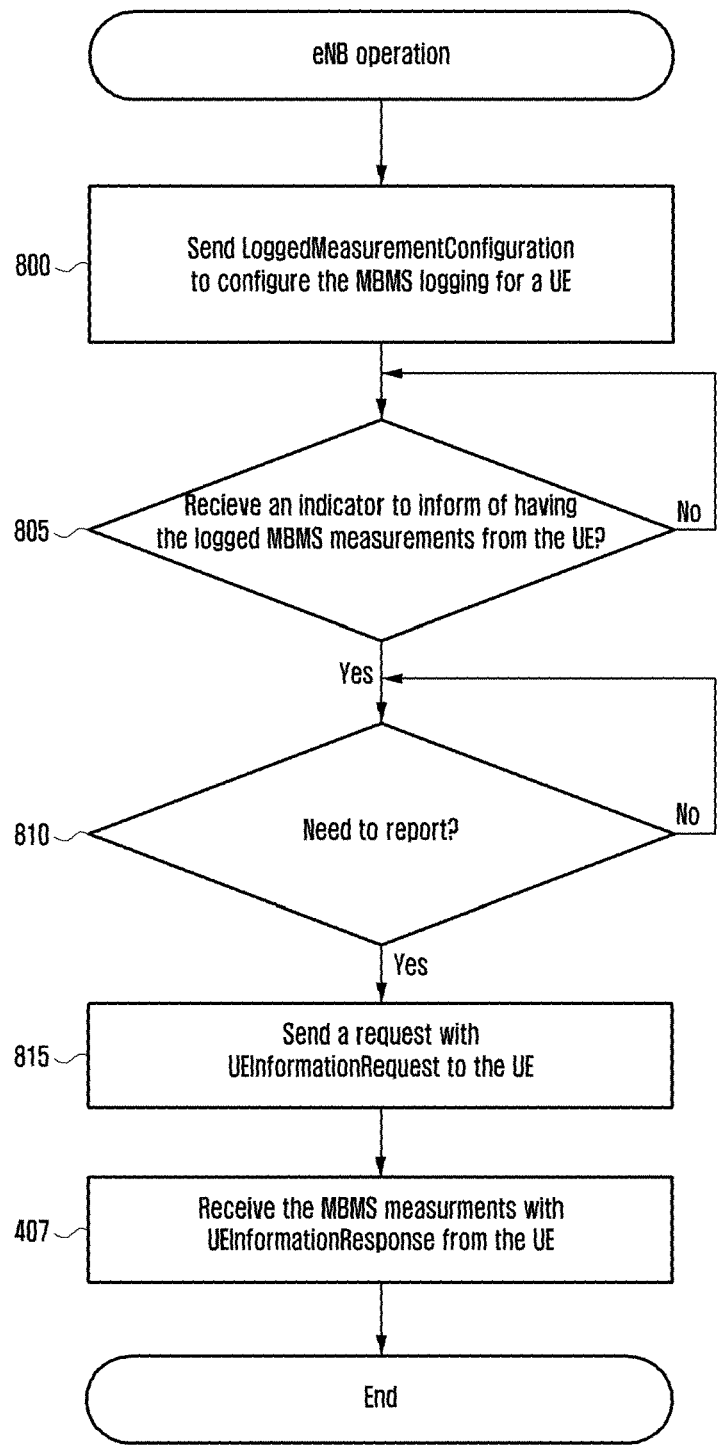
FIG. 8 is a flow chart that illustrates an operation of a base station, according to an embodiment of the present invention.

FIG. 8 illustrates an operation of a base station, according to an embodiment of the present invention.

Referring to FIG. 8, at step 800, a base station may transmit a message to a specific terminal in order to configure the MBMS information logging operation. The "LoggedMeasurementConfiguration" message may be transmitted.

At step 805, the base station may determine whether the terminal transmits an indicator indicating that the terminal is logging MBMS information.

The base station that has received the indicator may determine whether the information needs to be reported at step 810.

If the base station determines that a report is necessary at step 810, the base station may make a request to the terminal for a report at step 815. In an embodiment, the request for a report may use a "UEInformationRequest" message.

At step 820, the base station receives a report on the information from the terminal.

Example 2

In Example 2, a method for collecting MBMS information in a connection mode and directly reporting the same to a base station by a terminal is described. The above-described operation of the terminal is limited to terminals which have an ability of receiving an MBMS and which are to receive an MBMS service in a connection mode.

In Example 2, the conventional RRC measurement mechanism may be re-used. That is, a base station configures a terminal to collect and report MBMS information periodically or in an event-triggered manner through an "RRCConnectionReconfiguration" message. The periodical or event-triggered method were described in detail above. If the terminal has been receiving an MBMS information or triggers reception of an MBMS service, or if specific conditions are satisfied, the terminal reports the collected MBMS information to the base station.

Figure 9:
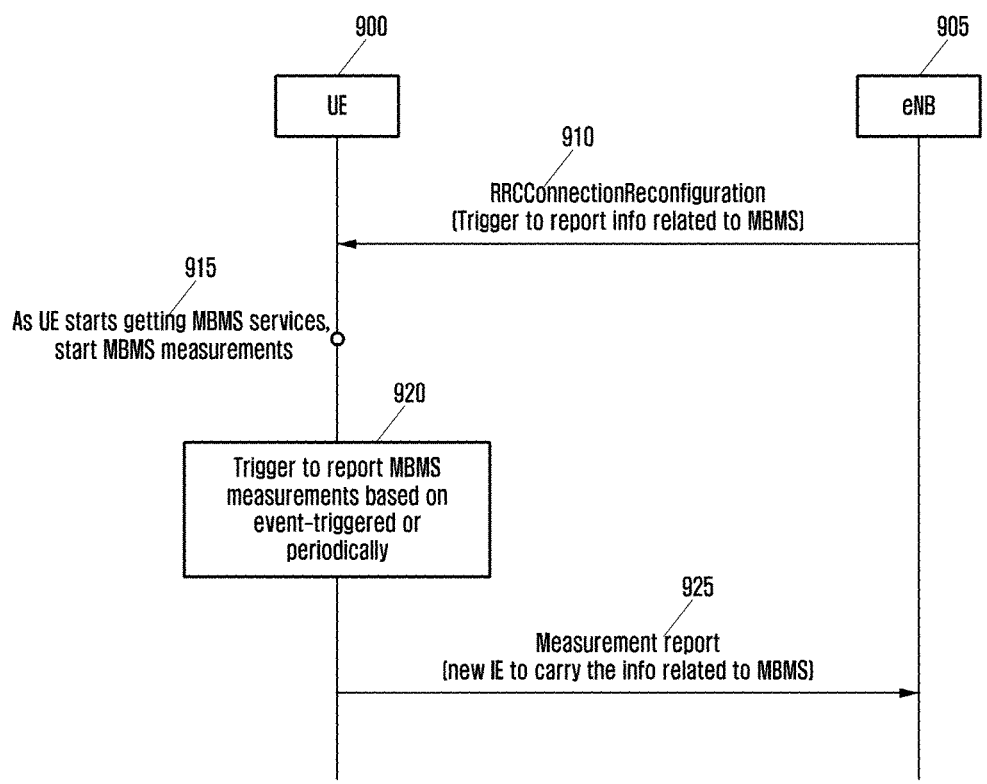
FIG. 9 illustrates a method for collecting MBMS information in a connection mode and directly reporting the same to a base station, according to an embodiment of the present invention.

FIG. 9 illustrates a method for collecting MBMS information in a connection mode and directly reporting the same to a base station, according to an embodiment of the present invention.

Referring to FIG. 9, at step 910, a base station 905 may configure a terminal 900 to report MBMS information. The configuration may be performed using an "RRCConnectionReconfiguration" message.

At step 915, if the terminal 900 has been receiving an MBMS service or starts to receive an MBMS service, the terminal may measure and collect MBMS information. According to an embodiment of the present invention, when the terminal 900 does not receive an MBMS service, the terminal 900 may not measure and collect MBMS information.

At step 920, the terminal 900 may trigger the operation of reporting the collected MBMS information to the base station periodically or when specific conditions are satisfied as configured by the base station 905 in step 910.

At step 925, the terminal 900 reports the collected MBMS information to the base station 905. The above report may be conducted by using a "MeasurementReport" message. According to an embodiment of the present invention, the time when the report is performed may be determined by the terminal or on the basis of information received in step 910.

Figure 10:
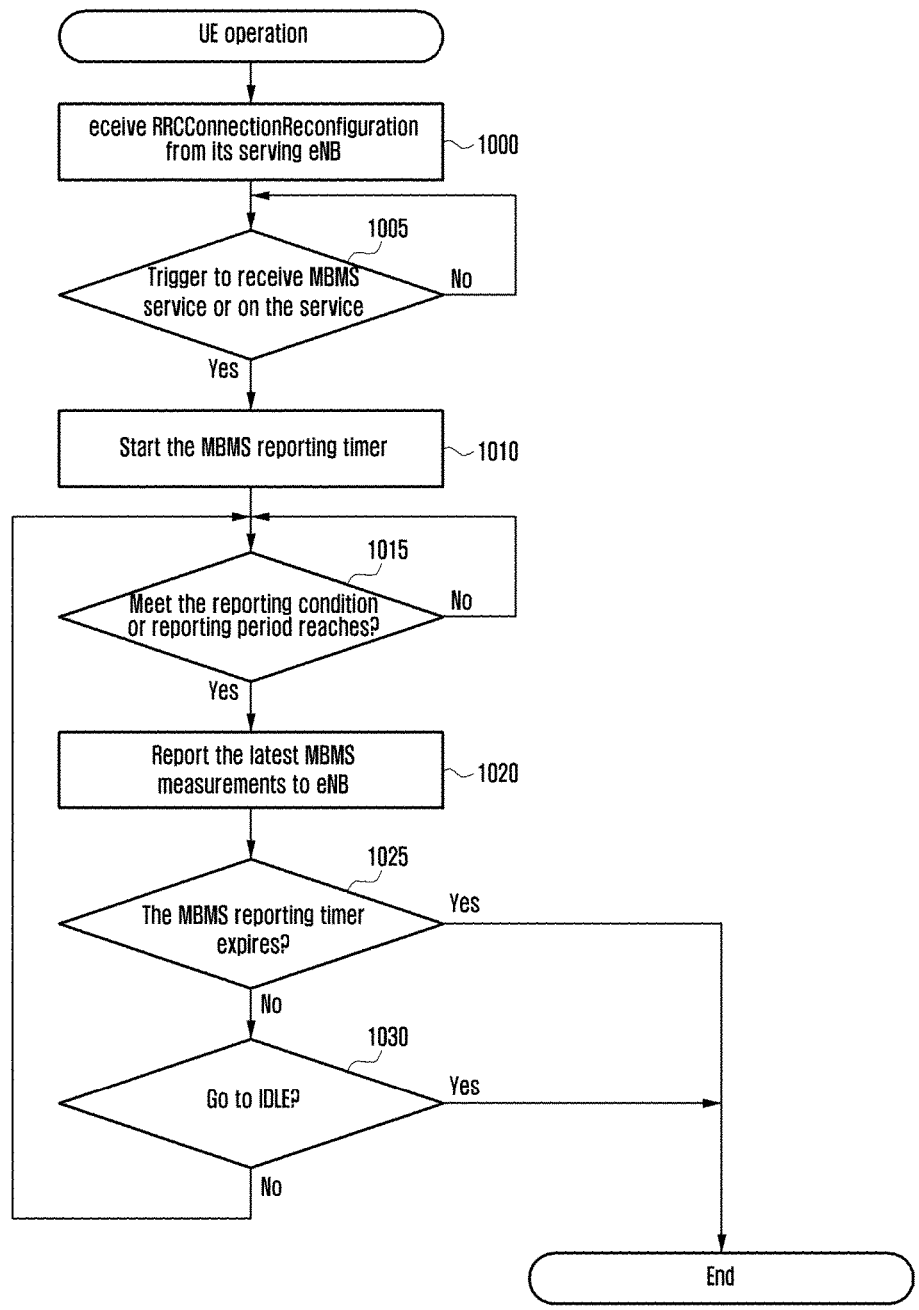
FIG. 10 is a flow chart that illustrates an operation of a terminal, according to an embodiment of the present invention.

FIG. 10 illustrates an operation of a terminal, according to an embodiment of the present invention.

Referring to FIG. 10, at step 1000, the terminal may receive an "RRCConnectionReconfiguration" message from the base station. The RRC message received by the terminal is transmitted for the purpose of configuring the terminal to report MBMS information to the base station in a connection mode. In addition, the RRC message includes configuration information necessary for reporting MBMS information by the terminal in a connection mode. The configuration information is listed below, and at least one piece of information among the listed configuration information is included in the RRC message in the present invention.

MBMS information may include reporting time or the allowed number of times of reporting. In this instance, a terminal of a connection mode performs the reporting of MBMS information for the corresponding time. The terminal receives an "RRCConnectionReconfiguration" message from the base station, and if reception of an MBMS service is triggered or the terminal has been receiving an MBMS service, the terminal immediately starts the timer. When the timer expires, the terminal stops the operation of reporting MSMN information.

The number of times of reporting or specific conditions may be used instead of the reporting time. In this case, by the number of times of reporting or when specific conditions are satisfied, the operation of reporting MBMS information may be stopped. One example of the specific conditions may be a case in which the terminal stops the receiving MBMS service.

MBMS information is reported periodically or in the event-triggered manner. A base station provides related configuration information. In accordance with the present invention, at least one of the two methods is configured to report the MBMS information.

In the periodic configuration method, which is when the MBMS information is reported periodically, the period of reporting is provided from a base station.

In the event-triggered configuration method, which is when the MBMS information is reported only when specific conditions are satisfied, configuration information related to the conditions is provided from a base station. Examples of the conditions were described above.

At step 1005, the terminal may trigger reception of an MBMS service, or determine whether an MBMS service is being received.

If the terminal triggers reception of an MBMS service or the terminal is receiving an MBMS service at step 1005, the terminal may allow an MBMS reporting timer to operate at step 1010.

At step 1015, the terminal determines whether it is time to report MBMS information according to a reporting period, or a specific condition triggering a report is satisfied. If the terminal determines that it is time for reporting at step 1015, the terminal reports the collected MBMS information to the base station at step 1020. According to an embodiment of the present invention, the reported MBMS information may be the latest MBMS information that is collected by the terminal.

At step 1025, the terminal may determine whether the MBMS reporting timer has expired. If the terminal determines that a timer has expired at step 1025, the terminal may stop the reporting operation.

At step 1030, the terminal may determine whether it is converted to an idle mode. As a result of the determination, if the terminal is converted to an idle mode, the terminal may terminate the reporting operation.

Figure 11:
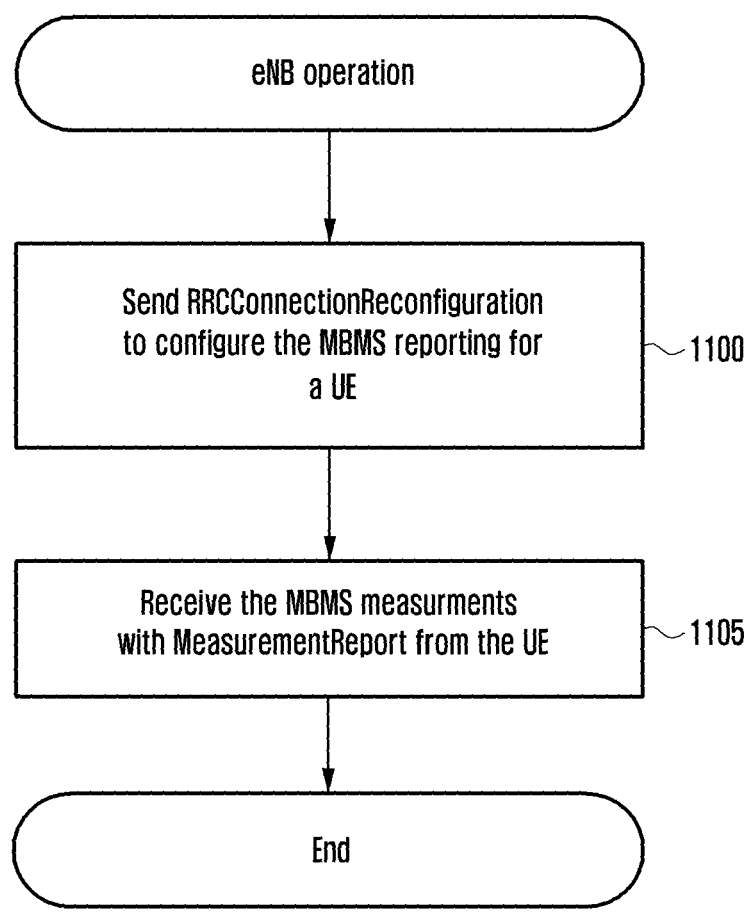
FIG. 11 is a flow chart that illustrates an operation of a base station, according to an embodiment of the present invention.

FIG. 11 illustrates the operation of a base station, according to an embodiment of the present invention.

Referring to FIG. 11, at step 1100, the base station may transfer a message including the configuration information to a certain terminal that is required to report MBMS information. The transferred message may be an "RRCConnectionReconfiguration" message.

At step 1105, the base station may receive MBMS measurement information from the terminal. The MBMS measurement information may be obtained through an "MeasurementReport" message.

Example 3

Examples 1 and 2 describe methods for reporting or logging MBMS information in a connection mode and an idle mode, respectively. Example 3 describes a method for maintaining the operation of reporting or logging MBMS information until specific conditions are satisfied regardless of a connection mode or an idle mode of a terminal. As described above, LTE terminals can be continuously provided with an MBMS service regardless of a connection mode or an idle mode of terminals. Accordingly, in order to obtain MBMS information, a base station allows a terminal to perform related operations in both a connection mode and an idle mode of the terminal by one-time configuration, so the exchange of messages can be reduced and a system configuration can be more simplified compared with the case in which the base station separately configures a connection mode and an idle mode of a terminal.

Figure 12:
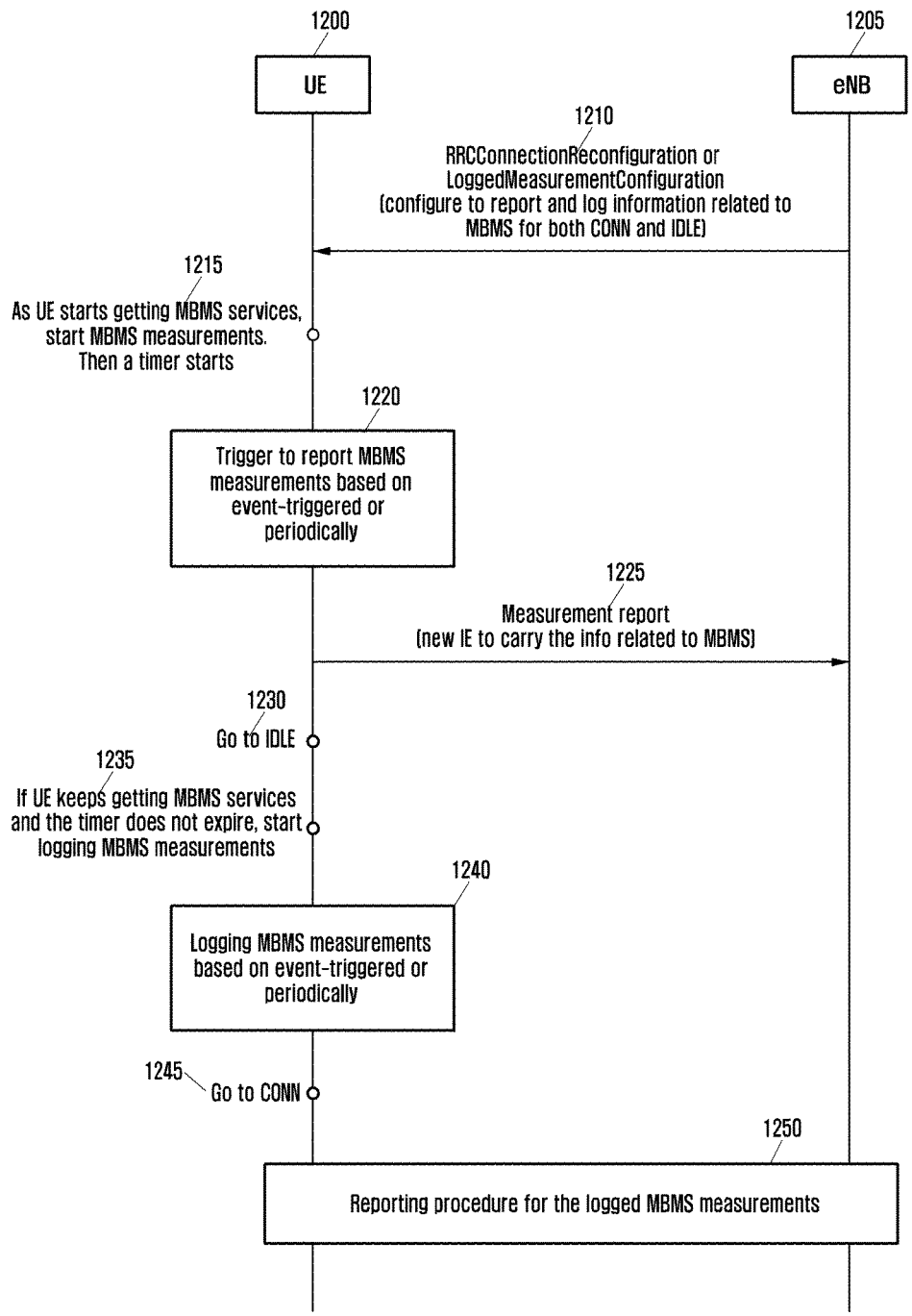
FIG. 12 illustrates a method for maintaining the reporting or the logging of MBMS information until specific conditions are satisfied in a terminal regardless of a connection mode or an idle mode, according to an embodiment of the present invention.

FIG. 12 illustrates a method for maintaining the operation of reporting or logging MBMS information until specific conditions are satisfied in a terminal regardless of a connection mode or an idle mode, according to an embodiment of the present invention.

Referring to FIG. 12, at step 1210, a base station 1205 transmits a specific RRC message that configures the operation of collecting and reporting MBMS information in a connection mode and an idle mode of a terminal to a terminal 1200. The RRC message may be at least one of an "RRCConnectionReconfiguration" message and a "LoggedMeasurementConfiguration" message. The RRC message includes at least one piece of information among the information described in Examples 1 and 2.

At step 1215, if the terminal 1200 triggers reception of an MBMS service or is receiving an MBMS service, the terminal 1200 measures MBMS information and starts a specific timer. In this embodiment, the terminal 1200 may operate the specific timer only when the terminal is receiving an MBMS service. When the timer has expired, the operation related to the MBMS information report is terminated. In this embodiment, the timer may continue to operate regardless of a connection mode or an idle mode of the terminal 1200. The termination of the MBMS information reporting operation may be determined in various ways. According to an embodiment of the present invention, for example, it may be designed to terminate the operation, if MBMS information is reported by a predetermined number of times, or specific conditions are satisfied.

At step 1220, the terminal 1200 may trigger an MBMS information operation according to information that is configured by the base station 1205 periodically or in an event-triggered manner.

At step 1225, the terminal 1200 transmits MBMS information to the base station 1205 by using a "MeasurementReport" message. The transmitted MBMS information may be the latest MBMS information that is measured by the terminal 1200.

At step 1230, the terminal 1200 is converted to an idle mode. In this embodiment, when specific conditions are satisfied, even though the terminal 1200 is converted to an idle mode, the MBMS information collecting operation is maintained. In this embodiment, if the terminal 1200 is converted to an idle mode and it receives an MBMS service, the terminal continues to collect MBMS information.

At step 1235, if the timer does not expire and the terminal 1200 continues to receive an MBMS service, the terminal 1200 is converted to the MBMS logging operation that is performed as in Example 1. If the timer does not expire, but the terminal stops to receive an MBMS service, the terminal does not trigger the MBMS logging operation and wait. If reception of an MBMS service is resumed before the timer expires, the terminal may trigger the MBMS logging operation.

At step 1240, the terminal 1200 logs MBMS information periodically or in an event-triggered manner on the basis of information configure by the base station 1205. If the timer expires during the MBMS logging operation, the terminal 1200 terminates the operation.

The terminal 1200 is converted to a connection mode again with the timer not expiring in step 1245.

At step 1250, the terminal 1200 performs the process of reporting the logged MBMS information to the base station as described in Example 1. In addition, if the timer does not expire and the terminal 1200 is receiving an MBMS service, the terminal performs the MBMS information reporting operation with respect to the base station 1205.

Figure 13:
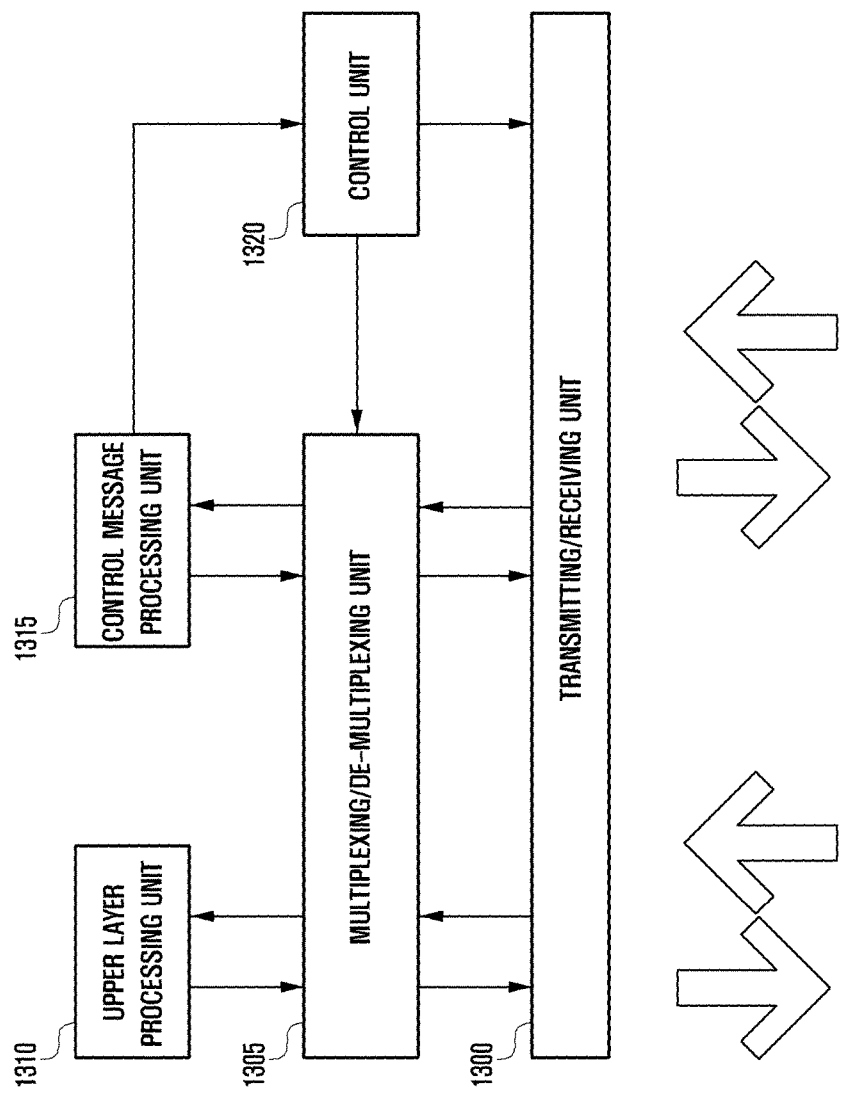
FIG. 13 is a block diagram illustrating an internal structure of a terminal, according to an embodiment of the present invention.

FIG. 13 is a block diagram illustrating an internal structure of a terminal according to an embodiment of the present invention.

Referring to FIG. 13, a terminal transmits and receives data to and from an upper layer 1310 and transmits and receives control messages through a control message processing unit 1315. Further, when the terminal transmits control signals or data to a base station, the terminal makes a multiplex with respect to data through a multiplexing unit 1305 and transmits the same through a transmitter 1300 under the control of a control unit 1320.

On the contrary, when the terminal receives signals, the terminal receives physical signals by means of a receiver 1300, then makes a de-multiplex with respect to the received signals by a de-multiplexing unit 1305, and transfers the same to the upper layer 1310 or the control message processing unit 1315 according to each message information, under the control of the control unit 1320.

Although the terminal is disclosed to have a plurality of blocks wherein each block performs different functions in the above description, this is an example only, and the present invention is not limited thereto. For example, the function of the de-multiplexing unit 1305 may be performed by the control unit 1320.

In this case, the control unit 1320 may detect generation of downlink scheduling at a certain transmission time interval. Also, the control unit 1320 determines the process of the downlink scheduling depending on whether the terminal is configured with transmission mode 9 or the transmission time interval corresponds to an MBSFN sub-frame. In addition, the control unit 1320 processes or disregards the downlink scheduling according to the determination result.

More specifically, the control unit 1320 determines whether the transmission time interval corresponds to a measurement interval, and if the transmission time interval corresponds to a measurement interval, the control unit 1320 disregards the downlink scheduling.

Furthermore, if the transmission time interval does not correspond to a measurement interval, the control unit 1320 determines whether the terminal is configured with transmission mode 9. If the terminal is not configured with transmission mode 9, the control unit 1320 determines whether the transmission time interval is an MBSFN sub-frame. Then, if the transmission time interval is an MBSFN sub-frame, the control unit 1320 disregards the downlink scheduling.

Also, if the transmission time interval is not an MBSFN sub-frame, the control unit 1320 processes the downlink scheduling.

In addition, if the terminal is configured with the transmission mode 9, the control unit 1320 processes the downlink scheduling.

Figure 14:
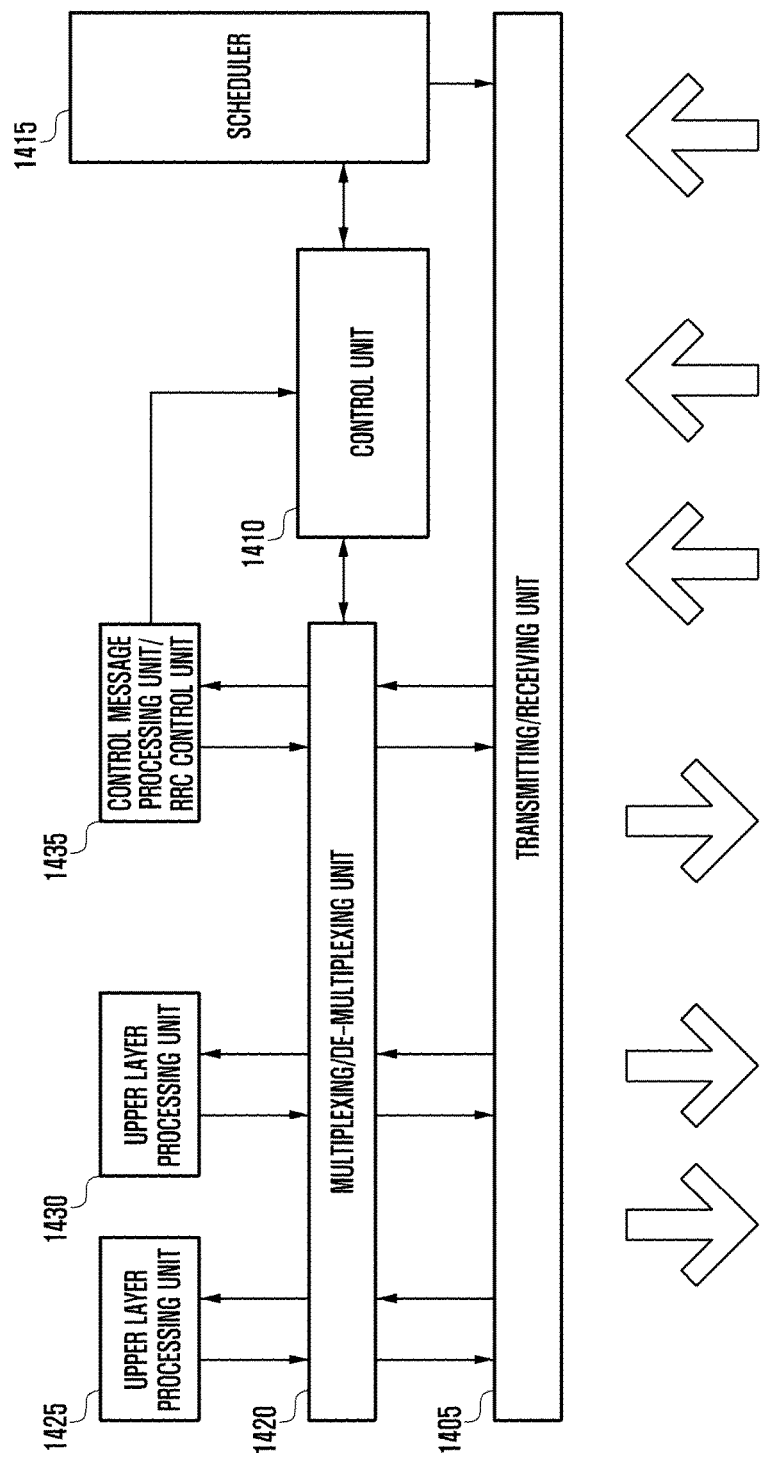
FIG. 14 is a block diagram illustrating an internal structure of a base station, according to an embodiment of the present invention.

FIG. 14 is a block diagram illustrating an internal structure of a base station according to an embodiment of the present invention.

Referring to FIG. 14, a base station of the present invention may include a transmitting/receiving unit 1405, a control unit 1410, a multiplexing/de-multiplexing unit 1420, a control message processing unit 1435, various upper layer processing units 1425 and 1430, and a scheduler 1415.

The transmitting/receiving unit 1405 transmits data and predetermined control signals with a forward direction carrier, and receives data and predetermined control signals with a reverse direction carrier. When a plurality of carriers are configured, the transmitting/receiving unit 1405 performs transmission and reception of data and control signals with the plurality of carriers.

The multiplexing/de-multiplexing unit 1420 generates a multiplex with respect to data generated in the upper layer processing units 1425 and 1430 or the control message processing unit 1435, or generates a de-multiplex with respect to data received from the transmitting/receiving unit 1405 to thereby transfer the data to the proper upper layer processing units 1425 and 1430, the control message processing unit 1435, or the control unit 1410. The control message processing unit 1435 processes control messages transmitted by a terminal to thereby take necessary operations, or generates control messages to be transmitted to a terminal to thereby transfer the control messages to lower layers.

The upper layer processing units 1425 and 1430, which may be configured in each terminal and each service, process data generated in user services such as FTP, VoIP, and the like to be thereby transferred to the multiplexing/de-multiplexing unit 1420, or process data received from multiplexing/de-multiplexing unit 1420 to be thereby transferred to service applications in the upper layer.

The control unit 1410 determines the time when the terminal transmits an MBMS and controls the transmitting/receiving unit.

The scheduler 1415 allots transmission resources to a terminal at proper time, considering a buffer state of the terminal, a state of the channel, active time of the terminal, or the like, and allows the transmitting/receiving unit to process signals transmitted by the terminal or transmit signals to the terminal.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method by a terminal in a communication system, the method comprising:
   receiving, from a base station, system information for a network including information for an area for the network and information for a control channel associated with the area;
   receiving, from the base station, configuration information for a measurement, the configuration information comprising target network area information and information on a logging interval for the measurement;
   when a service corresponding to the target network area information is being received based on the system information, performing logging of a measurement result for the target network area information during both an idle mode and a connected mode based on the configuration information and during the logging interval; and
   transmitting, to the base station, a message comprising information related to the measurement result including information corresponding to the target network area information, if the terminal has available logged measurement result related to the configuration information,
   wherein the measurement result includes a reference signal received power related to the target network area identified based on a reference signal for the service, a reference signal received quality related to the target network area, and a block error rate related to the target network area.

2. The method of claim 1, further comprising:
   receiving information related to a timer from the base station;
   starting the timer; and
   releasing, if the timer is expired, a configuration related to the configuration information.

3. The method of claim 1, wherein the target network area information is related to at least one of a broadcast network and a multicast network.

4. A method by base station in a communication system, the method comprising:
   transmitting, to a terminal, system information for a network including information for an area for the network and information for a control channel associated with the area;
   transmitting, to the terminal, configuration information for a measurement, the configuration information comprising target network area information and information on a logging interval for the measurement; and
   receiving, from the terminal, a message comprising information related to a measurement result corresponding to the target network area information, if the terminal has available logged measurement result related to the configuration information,
   wherein when a service corresponding to the target network area information is being received based on the system information, logging of the measurement result for the target network area information is performed and the measurement is stored at the terminal during both an idle mode and a connected mode based on the configuration information and during the logging interval, and wherein the second measurement result includes a reference signal received power related to the target network area identified based on a reference signal for the service, a reference signal received quality related to the target network area, and a block error rate related to the target network area.

5. The method of claim 4, further comprises:

transmitting information related to a timer to the terminal, wherein the terminal configured to start a timer and to release, if the timer is expired, a configuration related to the configuration information.

6. The method of claim 4, wherein the target network area information is related to at least one of a broadcast network and a multicast network.

7. A terminal in a communication system, the terminal comprising:

a transceiver for transmitting and receiving a signal; and
a controller coupled with the transceiver, the controller configured to:
receive, from a base station, system information for a network including information for an area for the network and information for a control channel associated with the area,
receive, from the base station, configuration information for a measurement, the configuration information comprising target network area information and information on a logging interval for the measurement,
when a service corresponding to the target network area information is being received based on the system information, perform logging of a measurement result for the target network area information during both an idle mode and a connected mode based on the configuration information and during the logging interval, and
transmit, to the base station, a message comprising information related to the measurement result corresponding to the target network area information, if the terminal has available logged measurement result related to the configuration information,
wherein the second measurement result includes a reference signal received power related to the target network area identified based on a reference signal for the service, a reference signal received quality related to the target network area, and a block error rate related to the target network area.

8. The terminal of claim 7, wherein the controller is further configured to receive information related to a timer from the base station, to start the timer and to release, if the timer is expired, a configuration related to the configuration information.

9. The terminal of claim 7, wherein the target network area information is related to at least one of a broadcast network and a multicast network.

10. A base station in a communication system, the base station comprising:

a transceiver for transmitting and receiving a signal; and
a controller coupled to the transceiver, the controller configured to:
transmit, to a terminal, system information for a network including information for an area for the network and information for a control channel associated with the area,
transmit, to the terminal, configuration information for a measurement, the configuration information comprising target network area information and information on a logging interval for the measurement, and
receive, from the terminal, a message comprising information related to a measurement result corresponding to the target network area information, if the terminal has available logged measurement result related to the configuration information,
wherein when a service corresponding to the target network area information is being received based on the system information, logging of the measurement result for the target network area information is performed and the measurement is stored at the terminal during both an idle mode and a connected mode based on the configuration information and during the logging interval, and
wherein the second measurement result includes a reference signal received power related to the target network area identified based on a reference signal for the service, a reference signal received quality related to the target network area, and a block error rate related to the target network area.

11. The base station of claim 10, wherein the controller is further configured to transmit information related to a timer to the terminal, wherein the terminal is configured to start a timer and to release, if the timer is expired, a configuration related to the configuration information.

12. The base station of claim 10, wherein the target network area information is related to at least one of a broadcast network and a multicast network.

* * * * *